Aug. 5, 1952  G. V. WOODLING  2,605,805
CONTRACTIBLE SPLIT SLEEVE LOCKING NUT
Filed Feb. 17, 1949
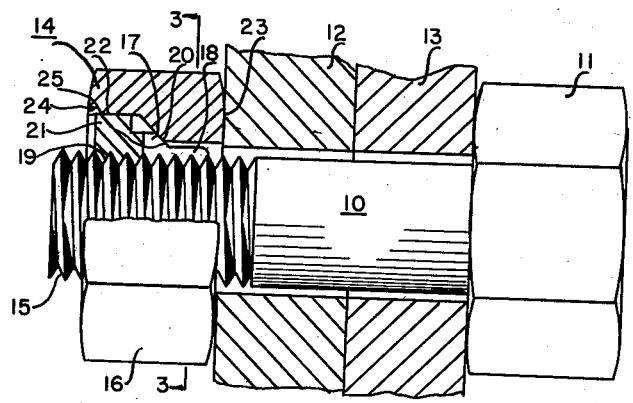
FIG. 1
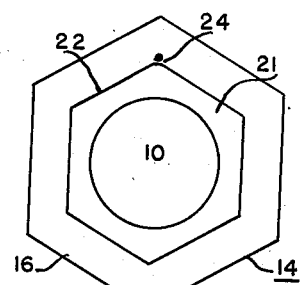
FIG. 2
FIG. 3
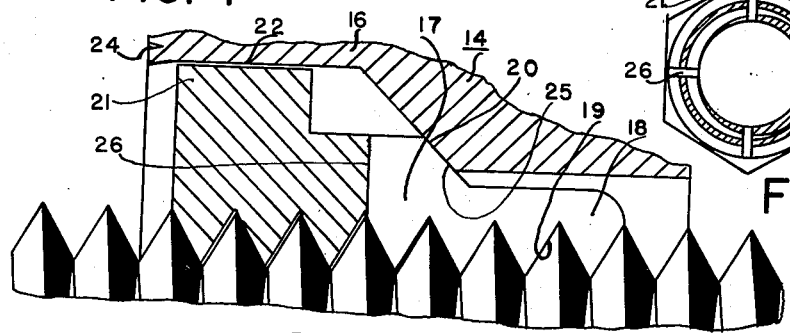
FIG. 4
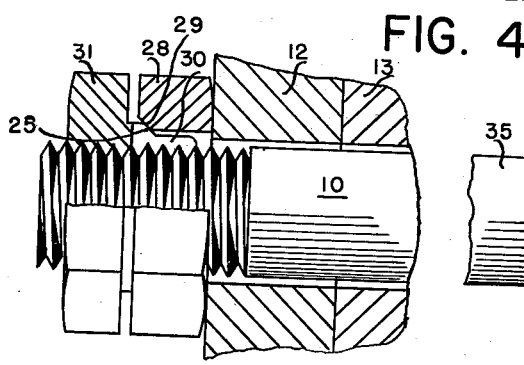
FIG. 5
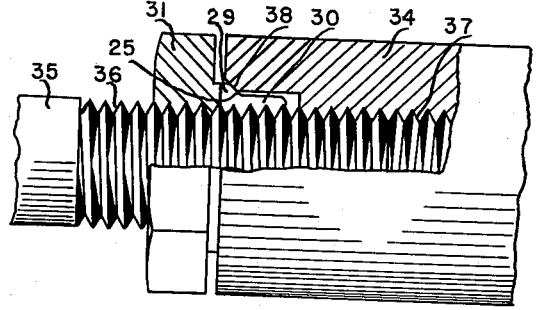
FIG. 6
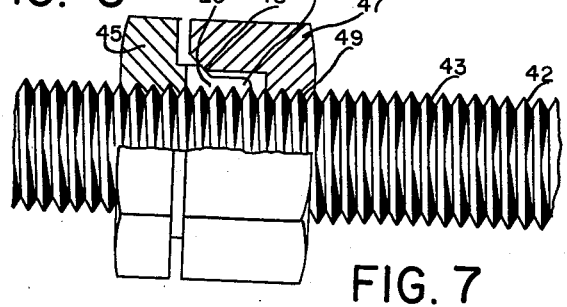
FIG. 7
INVENTOR.
George V. Woodling.

Patented Aug. 5, 1952

2,605,805

UNITED STATES PATENT OFFICE 2,605,805

CONTRACTIBLE SPLIT SLEEVE LOCKING NUT

George V. Woodling, Cleveland, Ohio

Application February 17, 1949, Serial No. 76,908

2 Claims. (Cl. 151—19)

My invention relates in general to locking nuts and more particularly to locking nuts employing a resilient contractible split ring sleeve for making locking engagement with the threadable element upon which the nut is turned.

An object of my invention is the provision of a locking nut having a contractible locking sleeve provided with a resilient split ring end portion which deflects into locking engagement with the threadable element upon which the nut is turned.

Another object of my invention is the provision of a contractible locking split ring sleeve which has spring fingers that remain alive and maintain resiliency between locking surfaces as the nut is tightened, as contrasted with prior art locking sleeves which remain dead or non-compliant when the nut is turned on tight.

Another object of my invention is the provision of a contractible split ring sleeve locking nut whereby the contractible split ring sleeve is deflected into locking engagement with the threadable element upon which the nut is turned and which springs back to release the threadable element upon the loosening of the locking nut.

Another object of my invention is the provision of a contractible split ring sleeve which is preferably constructed of steel or other metal capable of being hardenable throughout its entire mass, and which has spring fingers that are unsupported when the nut is turned on tight.

Other objects and a fuller understanding of my invention may be had by referring to the following description and claims, taken in conjunction with the accompanying drawing, in which:

Figure 1 is a longitudinal cross-sectional view of a locking nut embodying the features of my invention;

Figure 2 is an end view of my locking nut;

Figure 3 is a cross-sectional view taken along the line 3—3 of Figure 1, but showing only the cross-sectional view of the contractible split ring sleeve;

Figure 4 is a fragmentary enlarged view of the locking nut and showing principally the locking action of the contractible split ring sleeve;

Figure 5 shows a modified form of my invention, and illustrates the contractible split ring sleeve being integrally joined to the primary nut in which the contractible split ring sleeve is deflected into an internal annular cam surface of a secondary nut;

Figure 6 is a further modification of the invention shown in Figure 5 and illustrates the contractible split ring sleeve being integrally joined with a primary nut and in which the contractible split ring sleeve is deflected into an internal annular cam surface of an actuating rod or other element; and Figure 7 is a further modified form of my invention and comprises primary and secondary nuts in which the primary nut is provided with the contractible split ring sleeve that deflects into an internal annular cam surface of the secondary nut.

With reference to Figures 1, 2, 3 and 4 of the drawing, my invention is illustrated in connection with a bolt 10 having a head 11 which is adapted to fasten two plates 12 and 13 together. As illustrated, the bolt 10 is provided with male threads 15 upon which my locking nut is adapted to be threaded. My locking nut is indicated generally by the reference character 14 and comprises a hexagonal annular body member 16 in which is non-rotatively mounted a locking sleeve 17. The bore of the locking sleeve 17 is provided with female threads 19 for threadably engaging the male threads 15 of the bolt 10. The locking sleeve 17 comprises at its left-hand end a solid hexagonal head 21 and at its right-hand end a relatively thin split ring portion 18 having spring fingers. In the drawing, four spring fingers are shown, but any number may be employed. The fingers are provided by slotting the sleeve. The slots terminate at 26. As illustrated, the split ring end portion 18 of the sleeve is provided with a cam shoulder 25 and is adapted to be deflected into an internal annular cam surface 20 of the hexagonal nut or annular body member 16. The fingers each comprise a cam shoulder 25 and a tail portion extending away from the cam shoulder. The angle of the slope of the internal annular cam surface 20 may be in the neighborhood of 45°. The hexagonal head 21 of the sleeve is adapted to fit into a hexagonal socket 22 of the hexagonal annular body member 16. The non-rotative mounting of the head of the sleeve into the annular body member may be obtained my any suitable interlocking fit other than the hexagonal head and socket, such for example, as by interfitting longitudinal ribs or by eccentric head and socket assembly. The interfitting engagement between the hexagonal head 21 of the sleeve and the hexagonal socket 22 of the annular body member 16 provides a non-rotative connection between the sleeve and the annular body member so that when the annular body member 16 is turned with a tool the sleeve is likewise turned upon the threads 15 of the bolt 10.

As the annular body member 16 is turned on with a wrench the entire assembly of the locking nut moves to the right until the inside face 23 of the annular body member 16 engages the plate 12, at which point the sleeve is then drawn longitudinally to the right into the annular body member 16. The drawing of the sleeve into the annular body member 16 forces the outer cam shoulder 25 of the split finger of the sleeve into the internal annular cam surface 20 of the annular body member 16. The forcing of the cam shoulder 25 into the internal annular cam surface 20 operates to deflect the spring finger against the threads for making a resilient locking engagement therewith. The forward or outer ends of the spring fingers are unsupported by the annular body member 16 and thus the spring fingers remain alive and maintain resiliency between the locking surfaces. The tail portions 18 are solely actuated to their contracted position by the cam shoulders 25 and are longer in longitudinal extent than said cam shoulders and respectively extend away from the cam shoulders for a length greater than the pitch length of two female threads 19 on the inside of the tail portions. As the sleeve 17 is drawn into the annular body member 16 the hexagonal head of the sleeve moves longitudinally within the hexagonal socket 22 of the annular body member 16. In loosening my locking nut, it is only necessary to turn the hexagonal annular body member 16 in such direction as to cause the locking assembly to move away from the plate 12. After the hexagonal annular body member 16 has been unloosened for a partial turn or thereabout, it may be tapped with a suitable tool to loosen the camming action of the split fingers therein, after which the nut may be easily turned off without any drag being caused by the locking sleeve. The locking sleeve may be held inside of the annular body member 16 by providing a small punch indenture 24 to cause the edge of the hexagonal socket 22 to provide a stop so that the locking sleeve 17 cannot be readily removed from the inside of the annular body member 16.

The locking sleeve is preferably constructed of steel or other material capable of being hardenable and tempered throughout its entire mass to render it hard and resilient. I find that steel known as 4140, heat-treated throughout its entire mass and tempered to a hardness value of approximately 30 to 50 Rockwell, is satisfactory for my sleeve. Experience shows that a Rockwell value in the neighborhood of 45 is preferable. A heat-treated sleeve resists collapsing of the spring fingers so that the fingers spring back to release the threadable locking engagement of the bolt when the locking nut is unturned. One principal feature of the locking sleeve is that the split ring end tail portion 18 is unsupported by the annular body member 16 and thus they remain alive and maintain resiliency between the main locking surfaces, as distinguished from prior art sleeves wherein the split fingers become substantially dead or non-compliant when the locking nut is turned on tight. By reason of the fact that the unsupported spring fingers remain alive and maintain resiliency, the locking engagement always remains resilient whereby it is not easily shaken loose by vibration or other jarring action of the machine upon which the locking nut is mounted. The wall thickness of the split fingers of the split ring sleeve is such that they may be cammed inwardly notwithstanding the fact that the sleeve is constructed of hard and tough alloy steel which has been heat-treated to render it hard and resilient. The hexagonal body member 16 may be made of free machining steel and case hardened so that the split ring end portion 18 of the sleeve may readily cam thereinto. The annular body member may be made of free machining steel untreated, or it may be made of alloy steel known as 4140 heat treated throughout its entire mass and tempered to render it hard and resilient. The main requirement of the annular body member 16 is that it should be sufficiently strong so that the internal annular cam surface 20 does not swell when the sleeve is forced thereinto. The hardened alloy steel sleeve provides a resilient hit-home feeling to the turning of the annular body member 16, which means that there is live resiliency stored in the spring fingers which gives positive assurance that the annular body member 16 will not shake loose or otherwise turn after the locking assembly is turned on tight. The enlarged fragmentary view in Figure 4 shows the threads under the forward end of the split fingers cammed into tight engagement with the threads 15, whereas the threads under the hexagonal head 21 remain with the customary thread clearance. That is to say, the Figure 4 is shown with the locking sleeve shown in its cammed and locking engagement position.

In Figure 5 I show a modification of the invention, and in this modification the split contractible end 30 of the sleeve is integrally joined with a primary hexagonal nut 31. The cam shoulder 25 of the split contractible end 30 of the sleeve is adapted to cam into an internal annular cam surface 29 of a secondary hexagonal annular body member 28. In tightening the locking nut shown in Figure 5, it is only necessary for the operator to turn the primary hexagonal head 31 which forces the cam shoulder 25 of the split contractible end 30 of the sleeve into the internal annular cam surface 29 of the secondary hexagonal annular body member 28. The locking action of the split contractible end 30 of the sleeve in Figure 5 is the same as that illustrated in Figures 1 to 4 previously described.

The Figure 6 is a modification of the arrangement shown in Figure 5, in that the secondary hexagonal annular body member 28 is now in the form of an actuating rod 34 in which the threadable element 35 operates as an adjusting screw for operating hydraulic or other actuating tripping equipment. The adjusting screw 35 is provided with male threads 36 which threadably engage female threads 37 within the actuating rod 34. The actuating rod 34 is provided with an internal annular cam surface 38 in which the cam shoulder 25 of the split contractible end of the sleeve 30 is adapted to be cammed. The primary hexagonal head 31 and the sleeve 30 is the same as that shown in Figure 5, and the locking engagement of the split contractible end 30 of the sleeve is likewise the same as that shown in Figure 5.

In Figure 7 I show a further modified form of the invention, which comprises an elongated threadable element 42 having male threads thereon upon which my locking nut assembly is threadably mounted for longitudinal movement therealong for adjusting purposes. The solid end of the locking sleeve 44 is integrally joined with a primary hexagonal head 45. The cam shoulder 25 of the split locking sleeve 44 is adapted to cam into an internal annular cam surface 48 of a secondary hexagonal annular body 47. The secondary hexagonal annular body member 47 is provided with female threads 49 for engaging the male threads 43 so that when the two hexagonal members are screwed together on the threaded element 42 the locking sleeve 44 is cammed into the internal annular cam surface 48 of the secondary hexagonal annular body member 47. The camming of the split fingers against the male threads 43 operates to prevent the locking assembly from becoming loose through vibration or other jarring action.

The locking sleeve in all the forms of the invention shown herein is constructed of steel or other metal capable of being hardenable throughout its entire mass to render it tough and resilient so that the split fingers resist collapsing when the locking nut is turned on tight. Even though the fingers resist collapsing, yet the wall thickness thereof is such that they will deflect inwardly for engaging the threaded elements to provide a good locking engagement to prevent the locking nut from becoming loose under vibration. In other words, the split fingers are made physically thin enough whereby they may cam or deflect inwardly to provide a good locking engagement notwithstanding the fact that the sleeve is made of hardenable steel or other metals and is heat treated to render it hard and resilient. Experience shows that the spring fingers will spring back when the locking nut is released, to thereby enable the operator to unscrew the nut from the entire length of the threads without a dragging action. The sleeve may be made of any material so long as it has the physical property of camming in and yet having restored resiliency or life after the nut is unloosened or released. The sleeve is resilient and harder than the threaded element upon which the locking nut is threaded, whereby a good locking engagement or bite is effected to insure against the locking nut becoming loose under vibrations or other jolting operation of the machine.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. A resilient locking nut for a threaded element comprising an annular body member surrounding the threaded element and having an internal annular cam surface radially spaced from the threaded element, a resilient locking sleeve having a bore with female threads threadably engaging the threaded element and comprising a solid head portion and a plurality of spring fingers extending therefrom as cantilevers with each cantilever spring finger comprising first and second integral parts, said first part comprising a cantilever body having an outer cam shoulder spaced from said head portion for camming into said annular cam surface of the annular body member, said second part comprising a tail portion for deflecting inwardly against the threaded element, said tail portions having substantially a cylindrical outer surface, and means for forcing the outer cam shoulders into cam engagement with the internal annular cam surface of the annular body member to deflect the female threads on the inside of the tail portions into contracted position of spring tension engagement with the threaded element, said outer cam shoulders divergingly extending from the substantially cylindrical outer surface of said tail portions at an angle greater than 30° with respect thereto and terminating at a high point which is located closer to said solid head than to the bottom of the groove of the female threads in said sleeve, said tail portions being solely actuated to their contracted position by said cam shoulders and being longer in longitudinal extent than said cam shoulders and respectively extending away from said cam shoulders for a length greater than the pitch length of two female threads on the inside of the tail portions, said tail portions in their contracted position being radially spaced from and unsupported by the annular body member, said cantilever bodies comprising the first part of said fingers resisting radial deflection inwardly against the threaded element and maintaining a radial clearance between the threads of the sleeve and the threads of the threaded element, said sleeve being composed of spring steel heat treated throughout its entire mass to render it resilient whereby the elastic limit of said cantilever spring fingers in their contracted position will not be exceeded and whereby they will spring back from engagement with said threaded element to a partially open contractible position upon release of said cam engagement, said cantilever spring fingers in said partially open contractible position having a slightly greater internal radial dimension than the external radial dimension of said threaded element whereby the sleeve may be turned relatively easily with respect to said threaded element.

2. A contractible sleeve provided with a bore having female threads to receive an inside element to be connected thereto, said female threads having first and second converging sides for respectively engaging substantially complementary side walls of said inside element, said sleeve comprising a solid head portion and a plurality of spring fingers extending therefrom as cantilevers with each cantilever spring finger comprising first and second integral parts, said first part comprising a cantilever body having an outer cam shoulder spaced from said head portion, said second part comprising a tail portion for deflecting inwardly against the inside element, said tail portions having substantially a cylindrical outer surface, said outer cam surface arranged to make a cam engagement with an internal annular cam surface for camming said female threads inside of said tail portions into contracted position of spring tension engagement with the substantially complementary side walls of said inside element, said outer cam shoulders divergingly extending from the substantially cylindrical outer surface of said tail portions at an angle greater than 30° with respect thereto and terminating at a high point which is located closer to said solid head than to the bottom of the groove of the female threads in said sleeve, said tail portions being solely actuated to their contracted position by said cam shoulders and being longer in longitudinal extent than said cam shoulders and respectively extending away from and supported only by said cam shoulders for a length greater than the pitch length of two female threads on the inside of the tail portions, said cantilever bodies comprising the first part of said fingers resisting radial deflection against the inside element and maintaining a radial clearance between the threads of the sleeve and the complementary side walls of the inside element, said sleeve being composed of spring metal heat treated to render it resilient whereby the elastic limit of said cantilever spring fingers in their contracted position will not be exceeded and whereby they will spring back from engagement with said inside element to a partially open contractible position upon release of said cam engagement, said cantilever spring fingers in said partially open contractible position having a slightly greater internal radial dimension than the external radial dimension of said inside element whereby the sleeve may be turned relatively easily with respect to said inside element.

GEORGE V. WOODLING.

REFERENCES CITED

The following references are of record in the file of this patent:

UNITED STATES PATENTS

| Number | Name | Date |
| --- | --- | --- |
| 786,725 | Bryce | Apr. 4, 1905 |
| 1,376,296 | Snow | Apr. 26, 1921 |
| 1,470,528 | Flentjen | Oct. 9, 1923 |
| 1,640,650 | Ehrhardt | Aug. 30, 1927 |
| 1,891,358 | Pickop | Dec. 20, 1932 |
| 2,266,961 | Desbrueres | Dec. 23, 1941 |
| 2,361,814 | Berry | Oct. 31, 1944 |
| 2,402,583 | Schumacher | June 25, 1946 |